April 23, 1963

R. E. FINCH 3,087,139

ANGLE SETTING INDICATOR

Filed April 27, 1959

INVENTOR.
ROBERT E. FINCH

BY

ATTORNEY

April 23, 1963

R. E. FINCH 3,087,139

ANGLE SETTING INDICATOR

Filed April 27, 1959

INVENTOR.
ROBERT E. FINCH

BY

ATTORNEY 3,087,139
ANGLE SETTING INDICATOR
Robert E. Finch, 6308 Orchid Drive, Bethesda, Md.
Filed Apr. 27, 1959, Ser. No. 809,324
1 Claim. (Cl. 340—26)
(Granted under Title 35, U.S. Code (1952), sec. 266)

The invention described herein may be manufactured and used by or for the Government of the United States of America for governmental purposes without the payment of any royalties thereon or therefor.

This invention relates to landing of aircraft on decks of airplane carriers and in particular is concerned with carriers using the Mirror Deck Landing or "Fresnel" Lens Landing Systems and involves an arrangement for indicating at a remote control zone whether the conditions of the landing system existing on the ship deck are proper for the landing of aircraft.

The mirror deck landing system, for example, on carriers is physically movable by an operator on deck to adjust the mirror with respect to its vertical distance above or below the landing area, with respect to the pitch of the vessel or stabilization factor and with respect to its angle of inclination to suit the characteristics of different types of aircraft and provide the correct glide angle for insuring that a proper deck landing may be made. To this end, the mirror must be adjustable in height, it must be tiltable in elevation and its inclination with reference to the horizon, which is controlled by gyroscopic or other means as to stabilize the deck, must be adjusted at least to compensate for pitching movements of the ship in a seaway. In an aircraft carrier fitted with so-called "angle deck" i.e. one in which the runway is angled in relation to the centreline of the ship, it may be possible to site the mirror on or near the centreline of the ship where vertical movements of the mirror due to rolling will be negligible. In this position stabilization for roll as well as pitch can readily be achieved. In any event, the mirror settings are determined by and are under the control of an officer who is located remotely from the landing deck, and the various settings to which the mirror it to be adjusted are transmitted by the officer to the operator on the landing deck who, in turn, adjusts the landing system as requested or required.

This invention is concerned with an arrangement for indicating to the control officer the actual physical conditions of the mirror or mirror landing system after the adjustments have been made by the operator on deck. For this purpose, a register comprising a group of dials and an indicator therefore is located in the vicinity of the officer who, as he transmits the various settings to the operator on deck, manually adjusts the dials of the register to visually indicate to the officer the settings which the mirror operator on deck is to make. As the operator on deck makes the physical adjustments to the mirror or the mirror landing system in accordance with the transmitted instructions, they are immediately transmitted back to the register, by a system of automatic controls, and the register will indicate the adjustments which have actually been made by the operator on deck. When the mirror system has been adjusted accurately and as directed, the dials and indicator of the register will remain substantially stationary, however, if some error has been made in the settings by the operator on deck, the indicator will be caused to stray or vary from the setting made by the officer and will indicate the fact of some improper setting to the officer who may then direct the operator to make the proper adjustments.

In drawings.

Figure 1:
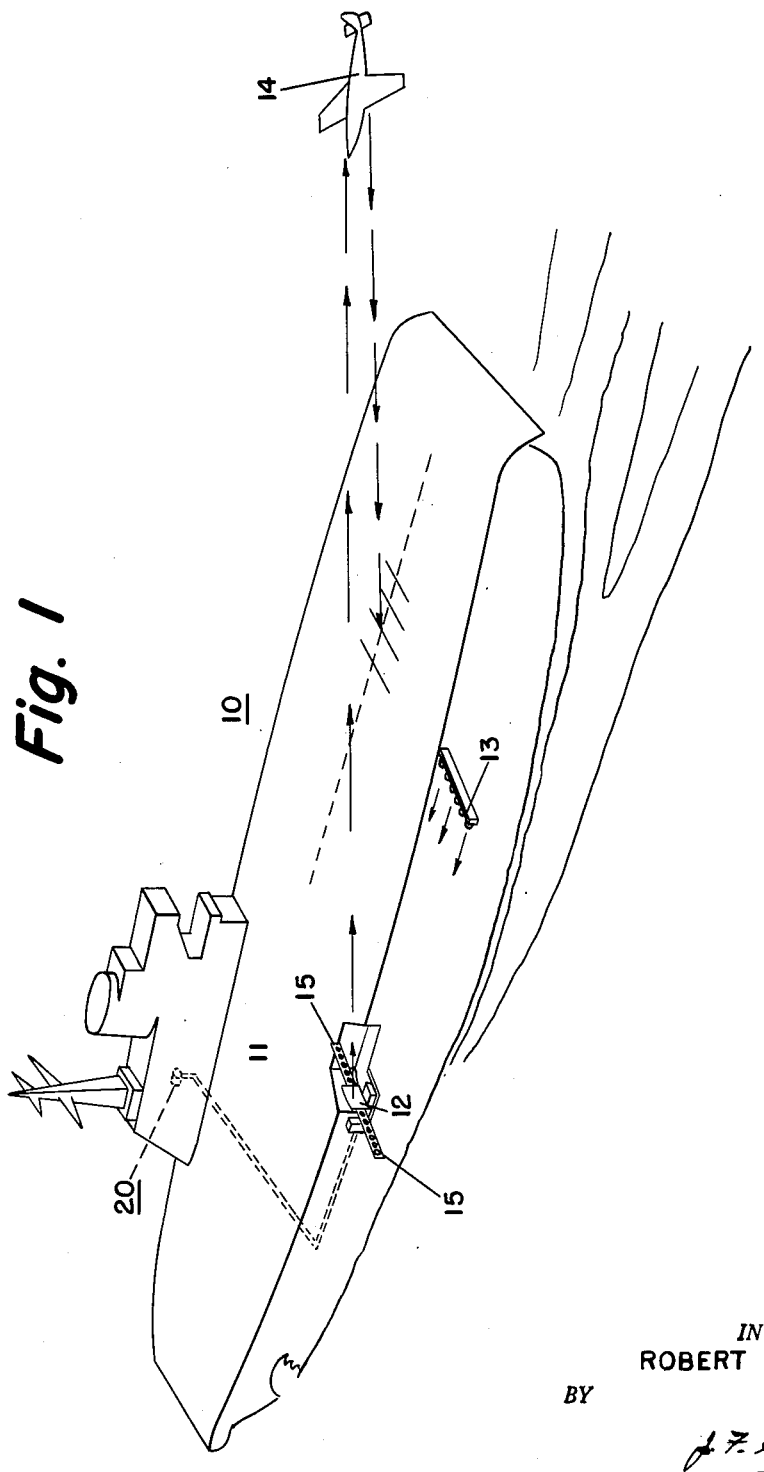
FIG. 1 is a generally diagrammatic view of an aircraft carrier equipped with a mirror deck landing system.

Referring to FIG. 1, 10 indicates an aircraft carrier and 11 the deck having superstructure thereon as shown. A large mirror 12 is mounted above the edge of the deck landing area generally opposite the superstructure, while some distance away from the mirror toward the stern of the vessel is located a source of light indicated generally at 13. The source of light will be shielded from direct view of the piloted craft, indicated at 14, and the source is directed toward the mirror as indicated by the arrowed lines. A row of datum lights 15—15 are positioned as shown to extend transversely from either side of the mirror mounting and are for the purpose of defining to the aircraft pilot a horizontal line across the center line of the mirror. By this general arrangement of the mirror and the light source, the mirror produces an image of the light souce and this image together with the line across the center of the mirror defined by the transversely extending datum lights indicates to the pilot whether or not he is on the proper glide or approach path for his aircraft. As long as the pilot can see the reflected light from source 13 in line with the horizontal line defined by the datum lights 15—15 he is on the correct glide path, however, if he sees the reflected light from the source, above or below the horizontal line defined by the datum lights, it indicates that he is not on the proper glide path and that no landing should be made.

Figure 2:
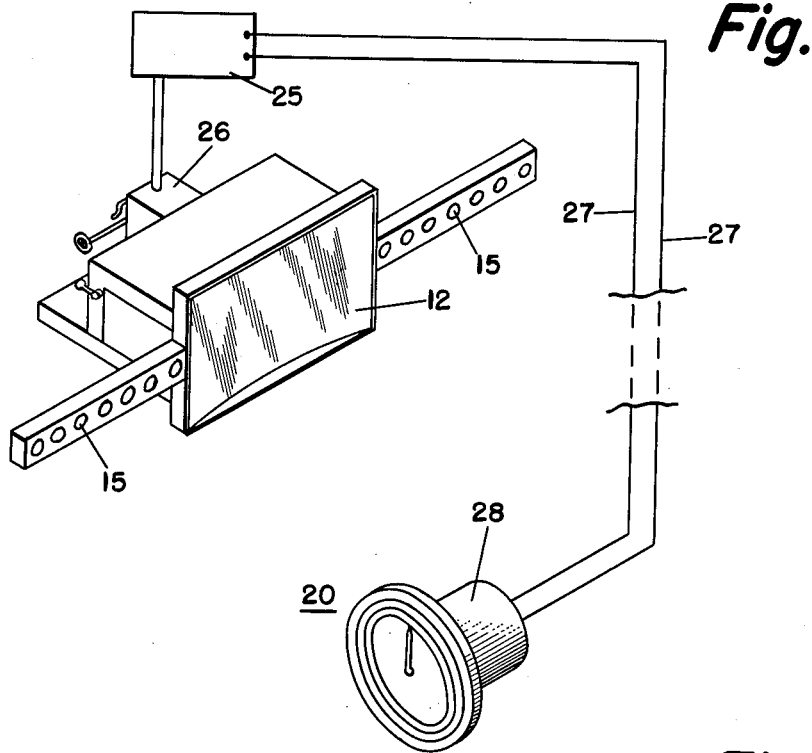
FIG. 2 is a view showing diagrammatically the assembly of the mirror landing system, the register and the control equipment.

As mentioned heretofore, when aircraft landings are to be made on the landing deck of the vessel 10, the mirror is adjusted to the proper settings by the operator who is positioned in the vicinity of the mirror operating mechanism while normally the officer who provides instructions for the settings is located remotely therefrom, for example, in the superstructure 11. The instructions for making proper adjustments are usually transmitted by telephone from the officer in the superstructure who gives instructions for the basic angle setting of the mirror with respect to the deck, basic height setting with respect to the deck and pitch angle setting to correct deck stabilization. As the instructions are given, the officer in the superstructure or zone remote from the mirror system will manually adjust the register indicated at 20, in FIGS. 2, 3 and 4, accordingly. The operator located in the vicinity of mirror system will make the physical adjustments to the mirror in accordance with instructions from the officer. The details of the adjusting mechanism for the mirror system are not necessary to an understanding of this invention but for purpose of reference this general mirror system is shown in Patent No. 2,784,935 issued March 12, 1957, to Goodhart.

In order to indicate to the officer, who has given the instructions for setting or making the actual physical adjustments of the mirror, an electric signal generator 25 is connected with the mirror adjusting mechanism located in compartment 26 and the electric signal generator 25 is placed in circuit by lines 27—27 with an electric responsive meter 28 which, in turn, is connected with elements of the meter for operating the register 20.

Figure 3:
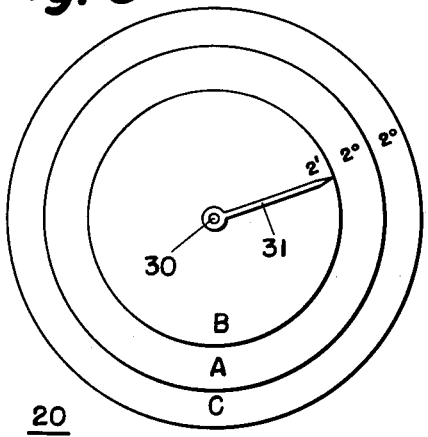
FIG. 3 is a view of the register adjusted to show the correct settings made by the officer in the remote area.

In FIG. 3, the register 20 is shown in the form of a dial which is made up of a plurality of dial cards A, B and C as indicated and which are concentrically mounted about a common shaft 30. The cards are preferably arranged to be movable about the shaft relative to each other and to an indicator 31 to permit the officer in the remote zone to move the cards in accordance with the desired settings.

The details of the card construction are not essential to an understanding of this invention but for the purpose of an explanation of the invention, the card identified as A may be used for the purpose of indicating the setting of the basic angle or approach angle of the plane with the deck and will be scaled in degrees, the card B may be used for height setting or distance of the mirror from the deck and scaled in feet while the card C may be used for adjusting the mirror for stabilization by a predetermined factor and scaled in degrees. As shown in FIG. 3, the cards A, B and C have been set respectively for a basic angle setting of 2°, a height setting of 2′ and a stabilization factor of 2°, and the indicator 31 so aligned with the cards. After the officer in the remote zone has set the register 20 and the mirror operator has adjusted the mirror and associated structure in accordance therewith, the signal generator 25 will function to signal the adjustments to pick-up meter 28 which may be a voltmeter, ammeter, synchronous recorder, etc., and connected to actuate the indicator 31 or the cards to register the actual adjustments of the mirror.

Figure 4:
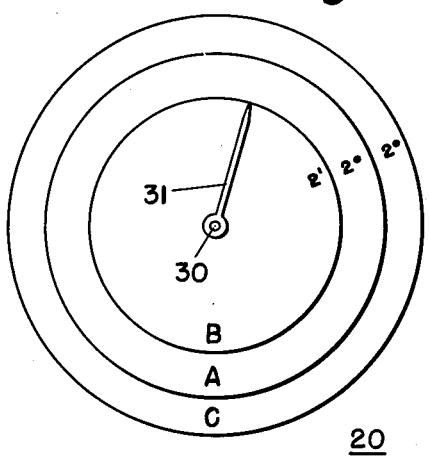
FIG. 4 is a view similar to FIG. 3 but showing the register when the mirror adjustments have not been properly made by the operator on deck.

Referring to FIG. 4, which shows a condition when the mirror operator has inaccurately made one or more of the physical adjustments to the mirror, the indicator 31, for example, will have moved away from the reference settings made by the officer and this will indicate in the remote zone that the actual adjustments are wrong and steps should be taken to correct the actual mirror settings and make the proper adjustments thereto.

Although only a single embodiment of the present invention has been illustrated and described, it will be apparent to those skilled in the art that various changes and modifications may be made therein without departing from the spirit of the invention or from the scope of the appended claim.

What is claimed is:

In a system for landing aircraft on a flight deck having a visual landing means thereon which is moved by a flight deck operator through a sequence of linear and angular adjustments in accordance with instructions transmitted from a remote area operator in order to position the visual landing means for the safe landing of aircraft on the flight deck, the improvement in landing control which comprises a register in the remote area, said register having a shaft mounting an indicator generally normal thereto and a plurality of concentric dial cards mounted on the shaft inwardly of the indicator, said dial cards each having indicia thereon and being rotatable relative to each other permitting their manual movement to position a selected indicia on each card in alignment with the indicator, said selected indicia when aligned with the indicator representing the linear and angular adjustments which are to be made to the visual means by the flight deck operator, a signal generator connected to said visual means for developing signals in accordance with actual adjustments which are made to the visual means and a meter in a circuit between said generator and the register whereby any improper adjustment of the visual means is observable by the operator in the remote area when the indicator and any of the selected indicia are out of alignment.

References Cited in the file of this patent

UNITED STATES PATENTS

| | | |
|---|---|---|
| 1,379,506 | Akemann | May 24, 1921 |
| 1,868,523 | Florey | July 26, 1932 |
| 2,321,699 | O'Brien | June 15, 1943 |
| 2,410,842 | Scholy | Nov. 12, 1946 |
| 2,471,220 | Lear | May 24, 1949 |
| 2,562,637 | Park | July 31, 1951 |
| 2,701,353 | Van Sickle | Feb. 1, 1955 |
| 2,932,014 | Thoresen | Apr. 5, 1960 |
| 2,958,847 | Trufanoff | Nov. 1, 1960 |

FOREIGN PATENTS

| | | |
|---|---|---|
| 336,157 | Switzerland | Mar. 31, 1959 |